United States Patent [19]

Donahue et al.

[11] 4,307,407

[45] Dec. 22, 1981

[54] INK JET PRINTER WITH INCLINED ROWS OF JET DROP STREAMS

[75] Inventors: John W. Donahue; James F. Gottman; Richard P. Wolf, all of Dayton, Ohio

[73] Assignee: The Mead Corporation, Dayton, Ohio

[21] Appl. No.: 164,103

[22] Filed: Jun. 30, 1980

[51] Int. Cl.[3] ............................................ G01D 15/18

[52] U.S. Cl. ........................................................ 346/75

[58] Field of Search ............................. 346/75, 140 IJ

[56] References Cited

U.S. PATENT DOCUMENTS

| | | | |
|---|---|---|---|
| 3,298,030 | 1/1967 | Lewis et al. | 346/75 |
| 3,641,588 | 2/1972 | Metz | 346/75 |
| 3,656,174 | 4/1972 | Robertson | 346/75 |
| 3,701,998 | 10/1972 | Mathis | 346/75 |
| 3,739,395 | 6/1973 | King | 346/75 |
| 3,983,801 | 10/1976 | Watanabe et al. . | |
| 4,010,477 | 3/1977 | Frey | 346/75 |
| 4,013,004 | 3/1977 | Watanabe et al. . | |
| 4,048,639 | 9/1977 | Walsh et al. | 346/75 |
| 4,060,804 | 11/1977 | Yamada | 346/75 X |
| 4,085,409 | 4/1978 | Paranjpe | 346/75 |
| 4,091,390 | 5/1978 | Smith et al. | 346/75 |
| 4,122,458 | 10/1978 | Paranjpe | 346/75 |
| 4,123,760 | 10/1978 | Hou | 346/75 |
| 4,194,210 | 3/1980 | Krause | 346/75 |

*Primary Examiner*—George H. Miller, Jr.

*Attorney, Agent, or Firm*—Biebel, French & Nauman

[57] ABSTRACT

An ink jet printer for selectively depositing drops from a plurality of jet drop streams along associated print lines on a moving print receiving medium includes a print head which generates a plurality of such streams arranged in one or more rows, which rows are inclined with respect to the direction of movement of the print receiving medium. The drops in the jet drop streams are selectively charged to a plurality of charge levels. Thereafter, the drops are deflected in a direction substantially perpendicular to the direction of movement of the print receiving medium into a plurality of print trajectories or, alternatively, into a catch trajectory. An apertured catch plate in one embodiment may be utilized with an inverted print head which prints upon the bottom of the print receiving medium.

14 Claims, 13 Drawing Figures

INK JET PRINTER WITH INCLINED ROWS OF JET DROP STREAMS

BACKGROUND OF THE INVENTION

The present invention relates to ink jet printers and, more particularly, to a printer producing a plurality of jet drop streams directed toward a print receiving medium. The jet drop streams are positioned along a row which is inclined with respect to the direction of movement of the medium and the jet drop streams are deflected in a direction substantially perpendicular to the direction of movement of the print receiving medium so that each stream deposits drops at a plurality of adjacent, laterally spaced print positions on the medium.

Ink jet printers of the type shown in U.S. Pat. No. 3,701,998, issued Oct. 31, 1972, to Mathis, include a print head having one or more rows of orifices which receive an electrically conductive fluid from a pressurized fluid manifold and eject the fluid in a plurality of jet drop streams. Graphic reproduction in recorders of this type is accomplished by selectively charging and deflecting some of the drops in each of the streams and depositing the uncharged drops on a moving web of paper or other material. In the Mathis printer, the direction of web movement is substantially perpendicular to the rows of orifices. Charging of the drops is accomplished by application of charge control signals to charging electrodes near the jet drop streams. As the drops separate from the fluid filaments emerging from each of the orifices, they carry a portion of the charge induced in the filament tips by the charging electrodes. Thereafter, the drops pass through an electrostatic field which has no effect upon the uncharged drops but which causes the charged drops to be deflected. Drops which are not to be printed are charged sufficiently to be deflected to drop catchers.

One problem with printers of this type, and with all types of ink jet printers, has been attaining sufficient image resolution. Since a discrete number of drops are applied to form the images on the print receiving medium, it is clear that image definition may be improved by increasing the number of drops deposited. If, however, each jet drop stream deposits drops of only one print position on the print receiving medium, the number of drops per unit width and, therefore, the resolution of an image in the direction transverse to the direction of movement of the medium is limited by the number of jet drop streams. This, in turn, is limited in a printer having a simple row of jet drop streams by the minimum dimensions required between adjacent orifices from which the jet drop streams emerge. The approach taken in the Mathis printer is to provide two rows of jet drop streams which are staggered, such that the print positions on the print medium serviced by one of the rows interlace with the print positions serviced by the other of the rows. The charging of the drops in the two rows is timed such that printing from the two rows of jet drop streams is maintained in registration.

Another approach which has been taken is to deflect drops from each of the jet drop streams to a plurality of adjacent print positions, such that each jet drop stream deposits drops along a number of adjacent print lines across the width of the print receiving medium. This has been accomplished in several ways. In U.S. Pat. No. 3,298,030, issued Jan. 10, 1967, to Lewis et al, an ink jet printer is disclosed in which deflection of each of the jet drop streams is produced by a raster scan signal supplied to a pair of parallel deflection electrode plates positioned laterally to either side of each of the jets. It will be appreciated that since a pair of deflection electrode plates and a catcher structure must be positioned between adjacent jet drop stream, the minimum interjet spacing in the Lewis et al printer and, therefore, the print image resolution in a direction perpendicular to that of the print receiving medium, is severely limited.

Similarly, U.S. Pat. No. 3,739,395, issued June 12, 1973, to King; U.S. Pat. No. 3,641,588, issued Feb. 8, 1972, to Metz; and U.S. Pat. No. 4,123,760, issued Oct. 31, 1978, to Hou, disclose ink jet devices having a row of jet drop streams extending generally perpendicular to the direction of movement of a print receiving medium, and in which drops are deflected in a direction oblique to the row such that the drops may service more than one print position. The King, Metz, and Hou printers all require deflection electrode plates interposed between adjacent jet drop streams, however, and therefore the minimum interjet spacing and resulting print resolution are limited.

Another approach which has been taken to increase the print image resolution produced by an ink jet printer is to provide one or more rows of jet drop streams which extend across the print receiving medium at an angle to the direction of movement of the medium. Such printers are shown in U.S. Pat. No. 4,010,477, issued Mar. 1, 1977, to Frey; U.S. Pat. No. 4,085,409, issued Apr. 18, 1978, to Paranjpe; U.S. Pat. No. 4,122,458, issued Oct. 24, 1978, to Paranjpe; and U.S. Pat. No. 4,048,639, issued Sept. 13, 1977, to Walsh et al. In the Frey '477 printer, a plurality of parallel angularly arranged jet drop stream rows are provided, with each jet drop stream servicing only a single print position on the print receiving medium.

The drops in the one or more rows of jet drop streams produced by the Paranjpe '409, Paranjpe '458, and Walsh et al printers are deflected in a direction substantially perpendicular to the row or rows of jet drop streams. As a consequence, the deflection electrode structure for producing drop deflection extends adjacent the row or rows of jet drop streams and the minimum interjet spacing is not limited by the need to interpose deflection structure between adjacent jets.

In such printers, where the charged drops are deflected in a direction substantially perpendicular to the jet drop stream rows and the rows extend obliquely with respect to the direction of paper movement, however, it will be appreciated that each jet drop stream is deflected both laterally, widthwise across the moving web, and longitudinally in the direction of web movement. In order to provide for a given amount of lateral deflection, therefore, it is necessary to deflect a drop in a direction perpendicular to the row of jets by a much greater distance. Such substantial deflection distances may be difficult to obtain if the print head construction limits the charge to mass ratio of the charged drops or the strength of the deflection fields. Additionally, if the angle of inclination of the row of jets with respect to the direction of movement of the print receiving medium is severe, a relatively long row of jets may be required to span even a narrow print receiving medium. Finally, since each of the print positions associated with the various print lines across the width of the print receiving medium in such a printer is displaced longitudinally along the print receiving medium from other print positions, complicated data handling and delay circuits are required for providing control signals to the jet charge electrodes at appropriate times to produce the desired print image.

U.S. Pat. No. 4,091,390, issued May 23, 1978, to Smith et al, discloses a recording device having an inclined row of ink jet nozzles which produce a row of jet drop streams, the drops of which are deflected by a single pair of planar electrostatic deflection plates common to all the nozzles and extending parallel to the row. The Smith reference teaches deflecting the drops in each of the jets in a direction perpendicular to the jet row to service a number of print lines across the print receiving medium, as well as deflecting the drops from the jets at an angle with respect to the inclined row of jet drop streams in order to compensate for the movement of the print receiving medium during the deposit of successive drops from each of the jet drops.

U.S. Pat. No. 4,060,804, issued Nov. 29, 1977, to Yamada, discloses an ink jet recording device having two jets which are displaced laterally and longitudinally above a moving print receiving medium, with each of the jet drop streams being deflected substantially perpendicularly with respect to the direction of movement of the medium so as to deposit drops at a number of laterally displaced print positions. Although deflecting the jet drop streams substantially perpendicular to the direction of movement of the print receiving medium, the Yamada printer is limited by virtue of its construction to a two-jet printer. Therefore, the Yamada printer is limited to printing a print receiving medium of a width which may be serviced by only two jets.

Another problem encountered with ink jet printers is that of providing adequate catching of drops which are directed into catch trajectories such that the drops do not strike a print receiving medium. A number of different catcher designs have been utilized in prior art printers but, typically, these catchers must be precisely positioned with respect to the jet drop streams. Additionally, fabrication of such catchers may be involved. One type of catcher, as illustrated in U.S. Pat. No. 3,656,174, issued Apr. 11, 1972, to Robertson, utilizes an apertured plate which defines an opening through which undeflected drops pass. Deflected drops strike the plate adjacent the opening, and are thereafter removed by appropriate fluid suction apparatus. Such apertured plates have generally been of only limited success, however, since ink drops and mist may tend to collect on the bottom of the plate and thereafter may drip onto the print receiving medium. It is desirable to utilize such an apertured plate catching arrangement, however, due to the simplicity of its construction and the fact that it does not add substantially to the thickness of the printer print head.

Accordingly, it is seen that there is a need for an ink jet printer, having an inclined row of jets, in which each of the jet drop streams may be deflected to service a number of adjacent print positions without requiring deflection electrode apparatus to be interposed between adjacent jets and in which each of the jet drop stream is deflected substantially perpendicularly with respect to the direction of movement of the print receiving medium. Additionally, there is a need for an improved catcher arrangement for an ink jet printer utilizing an apertured catcher plate in which ink is prevented from dropping from the plate onto the print receiving medium.

SUMMARY OF THE INVENTION

An ink jet printer for selectively depositing drops from a plurality of jet drop streams along associated print lines on a moving print receiving medium to produce collectively a print image thereon includes print head means for generating a plurality of jet drop streams directed at the print receiving medium, with the jet drop streams being arranged in a row which is inclined with respect to the direction of movement of the print receiving medium. A means is provided for selectively charging drops in each of the jet drop streams. A plurality of drop deflecting electrical fields are provided by appropriate means, with each of the plurality of jet drop streams passing through an associated one of the fields. The fields extend in a direction substantially perpendicular to the direction of movement of the print receiving medium, thereby deflecting the drops in each of the jet drop streams into a catch trajectory or into a selected one of a plurality of print trajectories. Deflection of the drops is in a direction substantially perpendicular to the direction of movement of the print receiving medium. A means is provided for catching drops in each jet drop stream which are deflected into a catch trajectory, whereby the drops in the print trajectories are deposited along print lines on the print receiving medium and the drops in the catch trajectories are prevented from striking the print receiving medium.

The means for selectively charging drops in each of the jet drop streams may comprise means for selectively charging drops in each jet drop stream to a selected one of a plurality of print charge levels or to a catch level, whereby drops charged to each print charge level are deflected in a direction parallel to the electrical fields to strike the print receiving medium on associated print lines, and whereby drops charged to the catch charge level are directed to the means for catching drops.

The means for catching drops in each jet drop stream may comprise catcher electrode means defining a plurality of catcher electrode surfaces, each of the catcher electrode surfaces being positioned adjacent a respective one of the jet drop streams and extending substantially parallel to the direction of movement of the print receiving medium.

The means for providing a plurality of drop deflecting electrical fields may comprise deflection electrode means defining a plurality of electrically conductive deflection electrode surfaces, each of the deflection electrode surfaces positioned adjacent a respective one of the jet drop streams on the opposite side thereof from the catcher electrode surface associated therewith. Each deflection electrode surface extends substantially parallel to its associated opposing catcher electrode surface. The means for providing a plurality of drop deflecting electrical fields further includes means for applying an electrical potential between each deflection electrode surface and its associated opposing catcher electrode surface, thereby producing a drop deflecting electrical field which extends substantially perpendicular to the direction of movement of the print receiving medium.

The means for providing a plurality of drop deflecting electrical fields further comprises field isolation means extending between adjacent jet drop streams to isolate each of the jet drop streams from deflection electrode surfaces and catcher electrode surfaces associated with adjacent jet drop streams, whereby the drop deflecting electrical fields are maintained substantially perpendicular to the direction of movement of the print receiving medium.

The plurality of jet drop streams may be directed toward the print receiving medium and the means for catching drops may include means defining a slot beneath each of the catcher electrode surfaces, means defining an ink manifold communicating with each of the slots, and means for providing an ink evacuating suction to the ink manifold whereby drops in the catch trajectories strike the catcher electrode surfaces and are ingested into the manifold through the slots.

Alternatively, the plurality of jet drop streams may be directed upward toward the print receiving medium and the means for catching drops in the catch trajectories may include an apertured catch plate, positioned above the catcher electrode means and defining a plurality of openings, with each of the openings being aligned with a respective one of the jet drop streams. By this arrangement, the drops in the print trajectories pass through the openings and strike the print receiving medium, while drops in the catch trajectories strike the catch plate. The catcher electrode means and the apertured catch plate means define a slot therebetween and the catcher electrode means defines an ink reservoir beneath the catch plate such that drops in the catch trajectories which strike the catch plate thereafter drip into the ink reservoir.

The print head means may generate a plurality of parallel rows of jet drop streams with each of the rows being inclined with respect to the direction of movement of the print receiving medium. The means for catching drops in each jet drop stream may include a plurality of catcher electrode means, each of the catcher electrode means being positioned adjacent and to a first side of an associated one of the rows of jet drop streams. The means for providing a plurality of drop deflecting electrical fields may comprise a plurality of deflection electrode means. Each of the deflection means is positioned adjacent and to a second side of an associated one of the rows of jet drop streams.

The plurality of catcher electrode means and the plurality of deflection electrode means are alternately arranged across the path of the print receiving medium. A frame means may be provided for mounting the plurality of deflection electrode means and the plurality of catcher electrode means.

Accordingly, it is an object of the present invention to provide an ink jet printer in which a print head generates a plurality of jet drop streams arranged in a row, which row is inclined with respect to the direction of movement of a print receiving medium, with drops from the jet drop streams being deflected in a direction substantially perpendicular to the direction of movement of the print receiving medium; to provide such a printer in which drops are selectively charged to selected ones of a plurality of print charge levels or to a catch charge level; to provide such a printer in which opposing catcher electrode surfaces and deflection electrode surfaces are associated with each of the jet drop streams, with each such surface extending substantially parallel to the direction of movement of the print receiving medium; and to provide such a printer in which catching of drops deflected in catch trajectories is accomplished by means of an apertured catch plate, with the jet drop streams being directed upward through the apertures in the catch plate and toward the print receiving medium.

Other objects and advantages of the invention will be apparent from the following description, the accompanying drawings and the appended claims.

DETAILED DESCRIPTION OF THE PREFERRED EMBODIMENT

Figure 1:
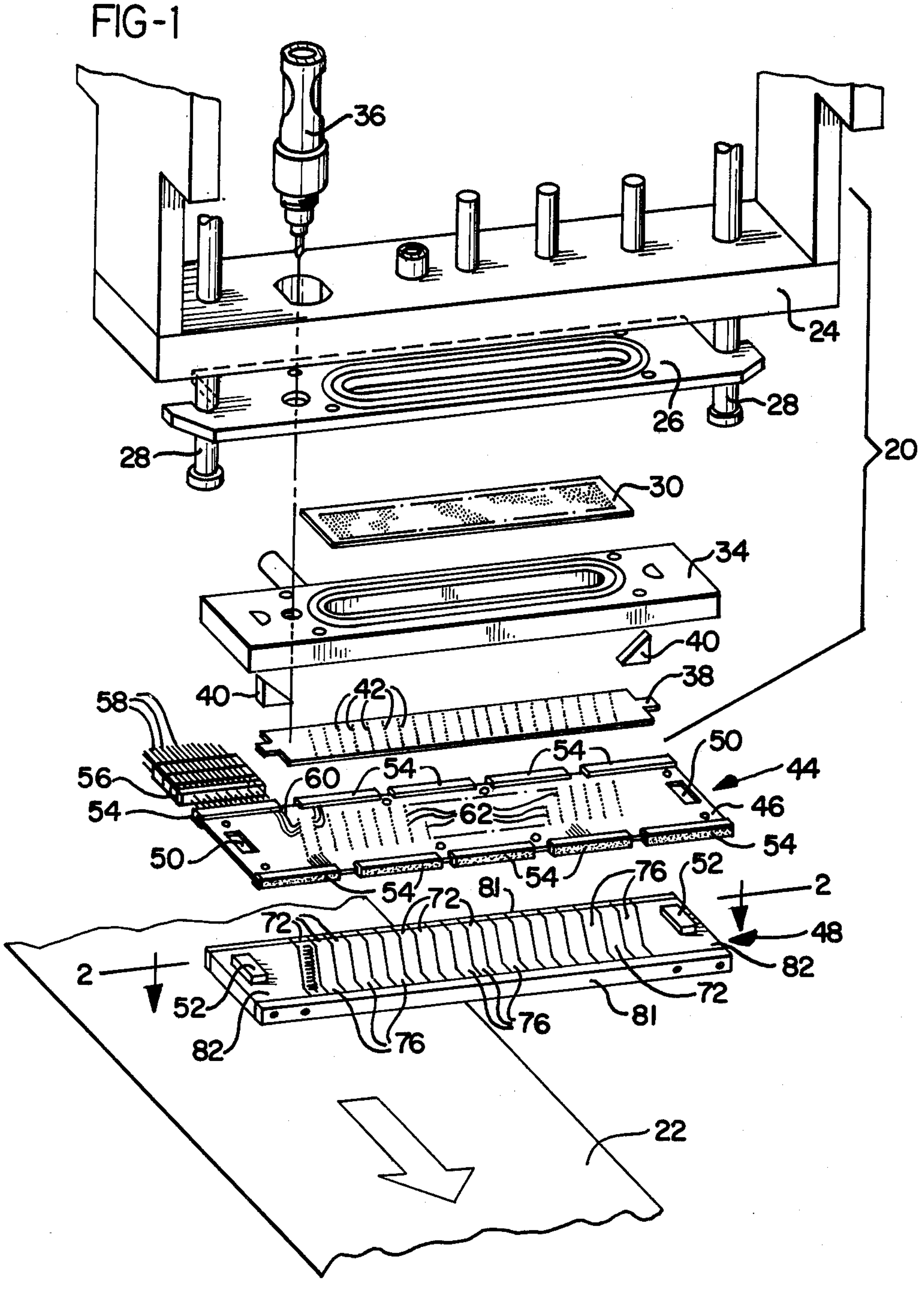
FIG. 1 is an exploded perspective view of an ink jet printer constructed according to a first embodiment of the present invention.

Reference is now made to FIG. 1 of the drawings which illustrates an ink jet printer constructed in accordance with a first embodiment of the present invention. The printer includes a print head means 20 for generating a plurality of jet drop streams directed at a moving print receiving medium 22, such as a paper web. As more fully explained below, each of the jet drop streams is arranged in a row which is inclined with respect to the direction of movement of the medium 22.

The print head means includes a support bar 24 and a clamp bar 26 connected thereto by means of clamp rods 28. Other elements attached to the clamp bar 26 by means of machine screws (not shown) are a filter plate 30, and a fluid supply manifold 34. A stimulator 36 is provided which reaches downwardly for contact against an orifice plate 38.

Orifice plate 38 is welded or soldered to the lower surface of manifold 34 and is stimulated by a traveling wave stimulation technique as described in detail in Lyon et al, U.S. Pat. No. 3,739,393. For facilitating such stimulation, there are a pair of dampers 40, the function of which is described in the Lyon et al patent. Orifice plate 38 is provided with a series of orifices 42 which are uniformly spaced along a series of angularly oriented placement lines.

The printer further includes a means 44 for selectively charging drops in each of the jet drop streams. Means 44 includes a charge ring plate 46 which is clamped between fluid manifold 34 and deflection and catching assembly 48. This clamping is facilitated by apertures 50 in charge ring plate 46 and seats 52 on deflection and catching assembly 48. This general type of charge ring plate clamping technique is disclosed and described in detail in Mathis, U.S. Pat. No. 3,701,998.

As also described in the Mathis patent, charge ring plate 46 includes a series of connectors 54 for connection to plugs 56 which carry a series of wires 58. Wires 58 carry data signals which are supplied by printed circuit conductors 60 to a series of charge rings 62. Charge rings 62 are aligned with orifices 42. Except for the geometrical arrangement of orifices 42 and charge rings 62, print head means 20 and the means 44 for selectively charging drops in each of the jet drop streams illustrated in FIG. 1 are substantially identical to corresponding elements illustrated in the above cited Mathis patent. Reference may be made to that patent for a fuller description of these elements.

Deflection and catching assembly 48 comprises a means for providing a plurality of drop deflecting electrical fields. Each of said jet drop streams passes through an associated one of the fields, with the fields extending in a direction substantially perpendicular to the direction of movement of the print receiving medium 22. Drops are charged selectively by the means 44 to one of a plurality of print charge levels or to a catch charge level such that the drops in each jet drop stream may be deflected into a catch trajectory or into selected ones of a plurality of print trajectories. Deflection of the charged drops occurs in a direction substantially perpendicular to the direction of movement of the print receiving medium. The catching and deflection assembly 48 further comprises a means for catching drops in each jet drop stream which are deflected into a catch trajectory, whereby the drops in the print trajectories are deposited along print lines on the print receiving medium and drops in the catch trajectories are prevented from striking the print receiving medium 22.

Figure 3:
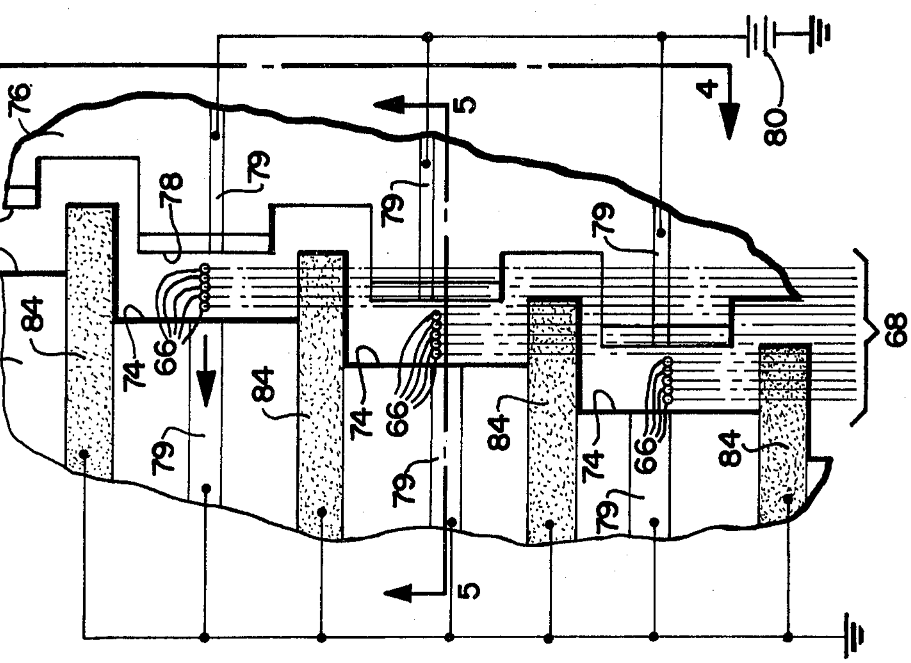
FIG. 3 is an enlarged plan view, similar to FIG. 2, illustrating printing along adjacent print lines.
Figure 2:
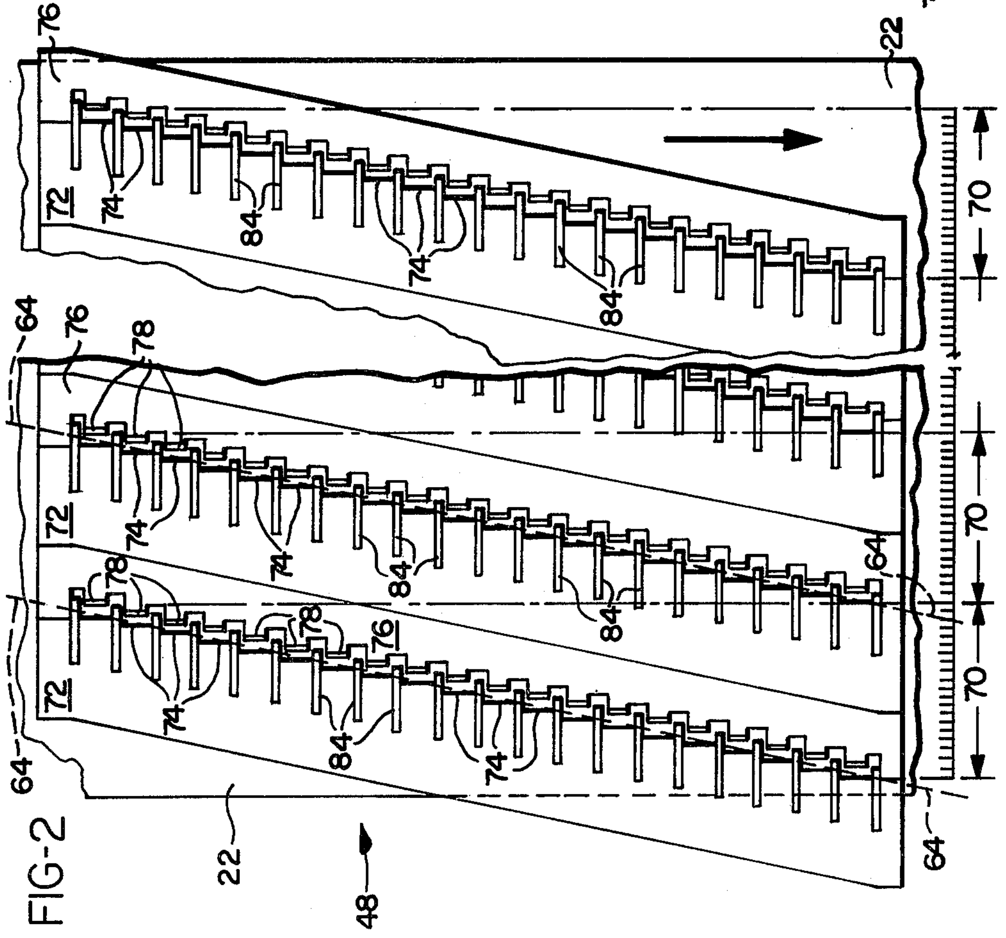
FIG. 2 is a partial plan view of the deflection and catching structure of the printer of FIG. 1, as seen looking downward generally along line 2—2 in FIG. 1.

Reference is now made to FIGS. 2 and 3 which are partial plan views illustrating the deflection and catching assembly 48. A plurality of parallel rows of jet drop streams are produced by print head 20, which rows extend generally along lines 64. Each jet drop stream is laterally deflected to a plurality of print positions 66 in order to service a number of print lines 68. The print lines 68 serviced by each jet drop stream are adjacent, and, further, the group of print lines serviced by each jet is directly adjacent the groups of print lines which are serviced by adjacent jets. As seen in FIG. 2, each of the rows of jet drop streams services all of the print lines in an associated one of the print line bands 70.

The means for catching drops in each jet drop stream comprises a catcher electrode means 72 defining a plurality of catcher electrode surfaces 74. Each of the catcher electrode surfaces 74 is positioned adjacent a respective one of the jet drop streams and extends substantially parallel to the direction of movement of the print receiving medium 22.

Assembly 48 further includes deflection electrode means 76 defining a plurality of electrically conductive deflection electrode surfaces 78. Each of the deflection electrode surfaces 78 is positioned adjacent a respective one of the jet drop streams on the opposite side thereof from the catcher electrode surface 74 associated with the jet drop stream. Each deflection electrode surface 78 extends substantially parallel to its associated opposing catcher electrode surface 74.

Catcher electrode means 72 and deflection electrode means 76 are preferably both formed of a nonconductive material, such as plastic, with the surfaces 74 and 78 coated with an electrically conductive material. These coatings are illustrated as being relatively thick, but it will be appreciated that substantially thinner coatings may be utilized as desired. Electrical conductors 79 may be plated on the catcher electrode means 72 and on the deflection electrode means 76 to provide a means for applying an electrical potential provided by voltage source 80 between each deflection electrode surface 78 and its associated opposing catcher electrode surface 74, thereby producing a drop deflecting electrical field which extends substantially perpendicular to the direction of movement of the print receiving medium 22. As seen in FIG. 1, mounting bars 81 which run the length of assembly 48 are connected to end blocks 82 and form a frame means for mounting the plurality of deflection electrode means 76 and the plurality of catcher electrode means 72.

Mounted on the catcher electrode means 72 are a plurality of field isolation fins 84 which extend between adjacent jet drop streams to isolate each of the jet drop streams from deflection electrode surfaces and catcher elctrode surfaces associated with adjacent jet drop streams. Fins 84 are electrically conductive and are all maintained at the same potential as surfaces 74 such that the deflection field impressed upon each jet drop stream extends substantially perpendicular to the deflection electrode surface 78 in the region of the jet drop streams. If the catcher electrode surfaces 74 are grounded, with the deflection fields being produced by supplying relatively high potential d.c. voltages to the opposing deflection electrode surfaces 78, it may be desirable to form the catcher means 72 completely from an electrically conductive material, grounding the catcher means 72 and all of the fins 84.

Figure 4:
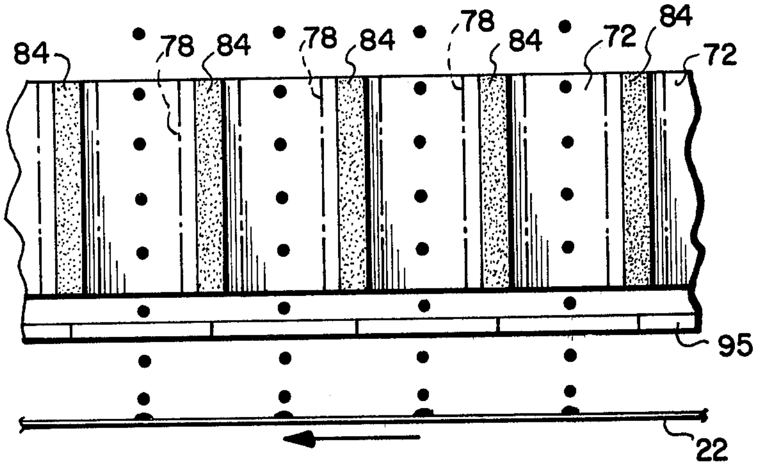
FIG. 4 is a view taken generally along line 4—4 in FIG. 3, with the deflection electrode means removed.
Figure 5:
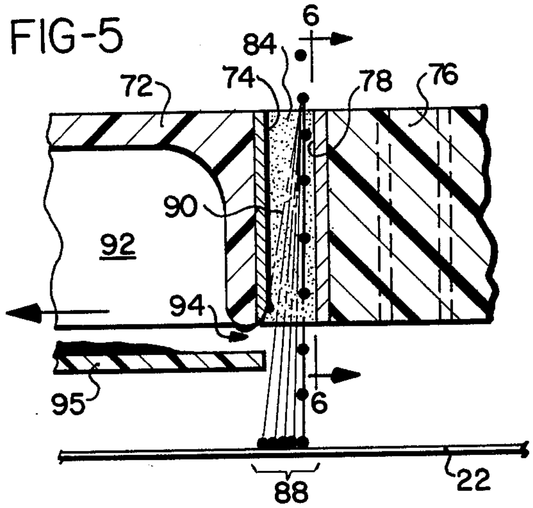
FIG. 5 is a partial sectional view taken generally along line 5—5 in FIG. 3.
Figure 6:
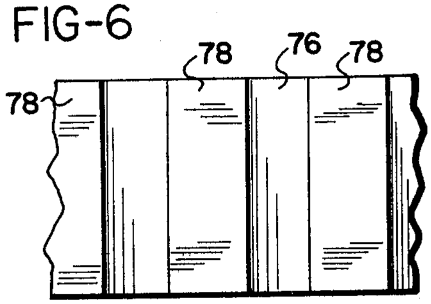
FIG. 6 is a view taken generally along line 6—6 in FIG. 5, illustrating the deflection electrode means.

As seen in FIGS. 4–6, the jet drop streams are directed downward toward the print receiving medium 22 through the electrical fields produced between the deflection electrode surfaces 78 and opposing catcher electrode surfaces 74. If the drops are charged to a relatively low charge level, or not at all, the drops pass through the electrical field in one of the print trajectories 88. If a drop is charged to a higher catch charge level, however, the drop is deflected into a catch trajectory, generally indicated at 90, such that it strikes the catcher electrode surface 74. The drop flows downward along the surface 74 and is thereafter ingested into a partially evacuated manifold 92 through a slot 94 beneath the catcher electrode surface 74. Plate 95 is positioned below the surface 74 and defines the slot 94 in conjunction therewith. The manifold 92 is connected to a source of ink evacuating suction which removes the ink collected within the manifold 92 for reuse by the print head.

Figure 7:
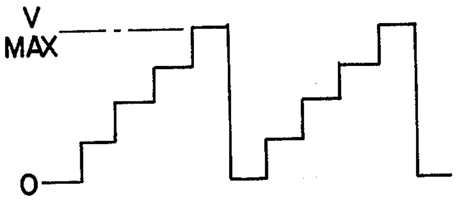
FIG. 7 is a wave form diagram useful in explaining charging of drops in a jet drop stream.
Figure 8:
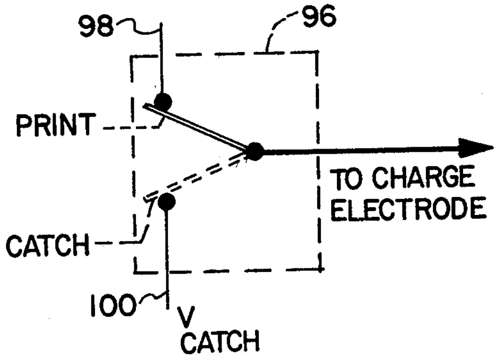
FIG. 8 is an electrical schematic diagram showing a charge control switch for a charge electrode.
Figure 10:
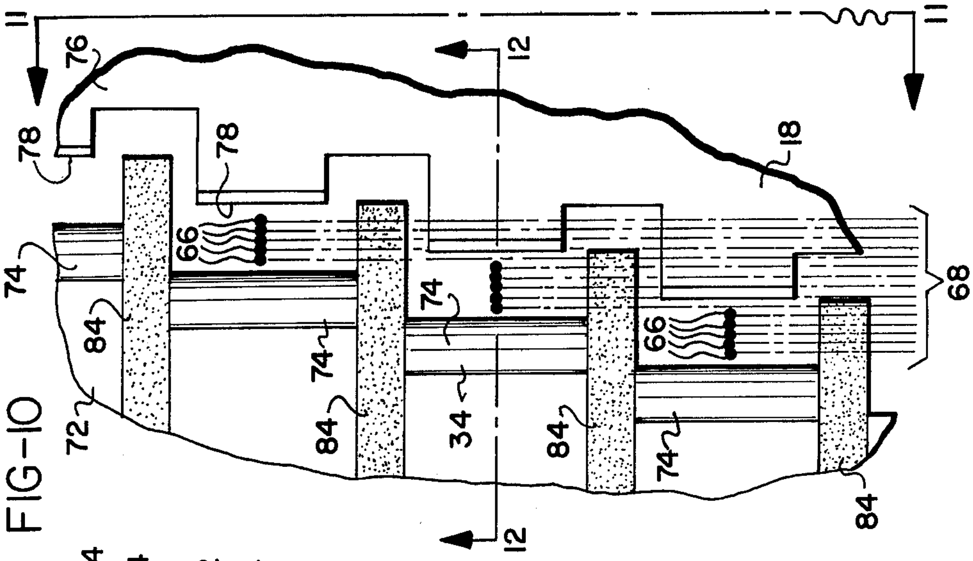
FIG. 10 is an enlarged plan view, similar to FIG. 9.

The charge carried by each drop is a function of the charge level applied to its associated charge electrode during formation of the drop. The higher the charge level supplied to the charge electrode, the greater the induced charge carried by the drop. In order to provide for charging to a plurality of levels, each charge electrode 62 receives a charge signal from a charge control switch 96, as shown in FIG. 8. Switch 96 is illustrated as a mechanical switch; however, it will be appreciated that it may be preferred to utilize transistor switching circuitry. A staircase charge level signal, cyclically stepped between O and $V_{MAX}$ as shown in FIG. 7, is supplied to the print input line 98, whereas a substantially greater d.c. potential $V_{CATCH}$ is supplied to the line 100. If the switch 96 is switched into its upper switching state, as shown in FIG. 8, the print signal of FIG. 7 is supplied continuously to the associated charge electrode, with the result that drops are sequentially deflected to adjacent print positions 66 in a raster-like format. When a drop is not to be deposited upon the print receiving medium, however, switch 96 is switched into its lower switching position, such that a substantially greater charge is impressed upon the drop, resulting in the drop being deflected into a catch trajectory. Control of the switching state of switch 96 is accomplished in an appropriate sequence to define the image which is to be printed.

It will be appreciated that the illustrated printer has a number of substantial advantages. The arrangement of printer components is such that the jets may be laterally displaced across the width of medium 22 by as small a distance as may be desired. As a consequence, lateral resolution of the print image is not limited by the need to position deflection plates between adjacent jets, as is the case with a number of prior art printers. Additionally, since deflection of the drops in the jet drop streams is accomplished solely laterally with respect to medium 22, the drops need be deflected no further than is desired for inter-print line spacing.

Reference is now made to FIGS. 9–13 which illustrate a printer constructed according to a second embodiment of the invention. In this embodiment, the drops from the jet drop streams are deposited on the bottom of the print receiving medium 22. The print head means 20 and the means for charging the drops 44 are substantially the same as illustrated in FIG. 1, with the exception that the entire printer is inverted and positioned beneath the print receiving medium 22. Additionally, the deflection and catching assembly of this embodiment is similar in many respects to that of the embodiment of FIGS. 1–8. As a consequence, identical reference numerals have been used in FIGS. 9–13 to designate corresponding structural elements.

Figure 9:
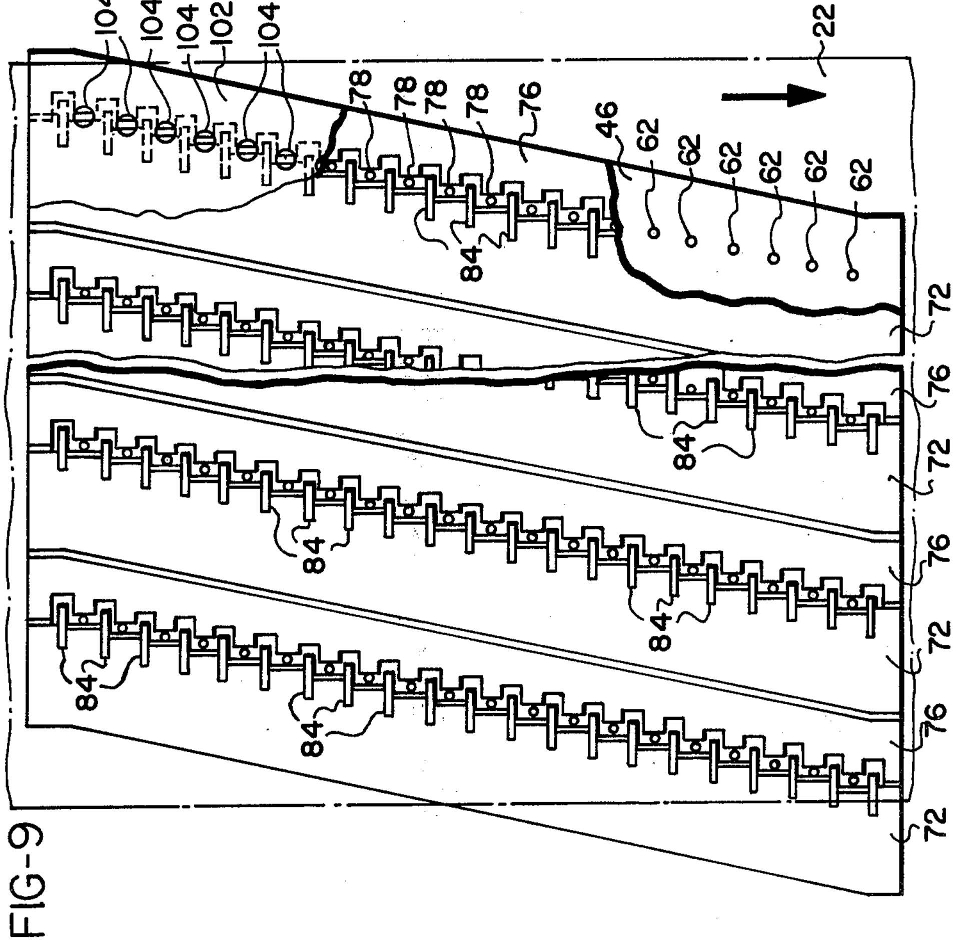
FIG. 9 is a plan view, similar to FIG. 2, of a second embodiment of the printer of the present invention.
Figure 11:
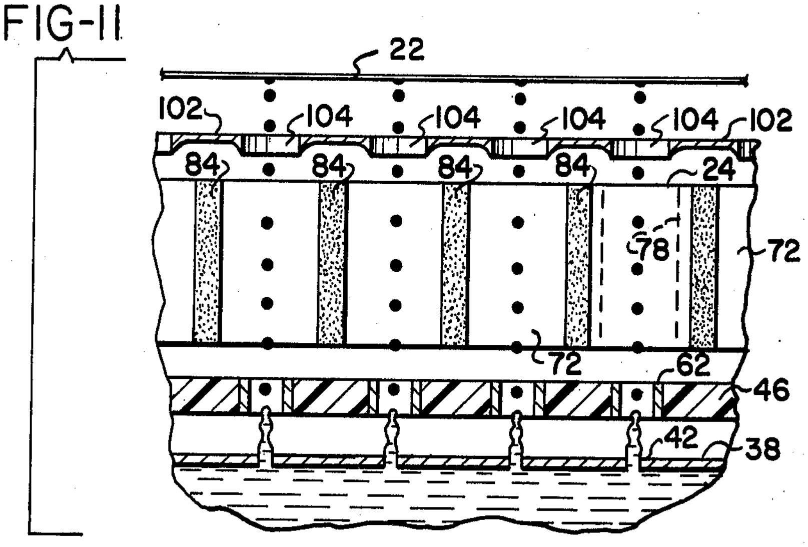
FIG. 11 is a sectional view taken generally along line 11—11 in FIG. 10, with the deflection electrode means removed.
Figure 12:
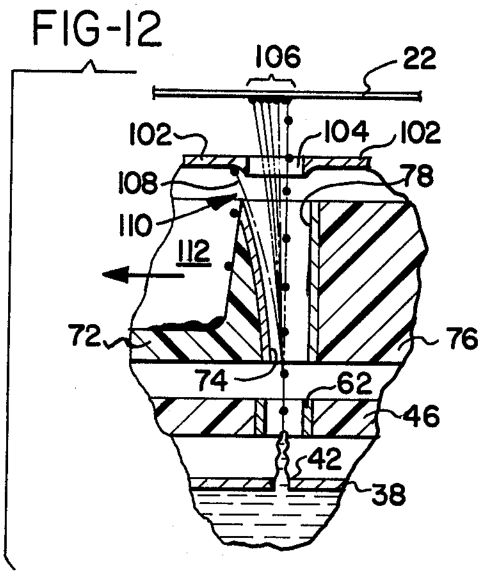
FIG. 12 is a partial sectional view, taken generally along line 12—12 in FIG. 10.
Figure 13:
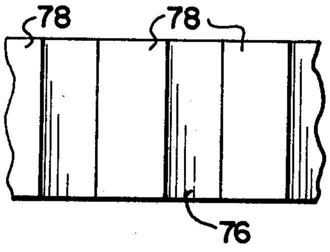
FIG. 13 is an end view of the deflection electrode means, as seen looking left to right in FIG. 12.

As seen most clearly in FIGS. 9, 11 and 12, the means for catching drops in catch trajectories in each of the jet drop streams includes an apertured catch plate 102 which is positioned above the catcher electrode means 72 and which defines a plurality of openings 104. Each of the openings 104 is aligned with a respective one of the jet drop streams such that drops in print trajectories 106 pass through the openings 104 and strike the print receiving medium 22, while drops in catch trajectories 108 strike the catch plate 102. The apertured catch plate 102 and the catcher electrode means 72 define a slot 110 therebetween. The catcher electrode means 72 defines an ink reservoir 112 beneath the catch plate such that drops in the catch trajectories pass through the slot 110 to strike the catch plate 102 and, thereafter, drip into the ink reservoir 112.

It may be noted that the catcher electrode surface 74 is curved rearwardly away from the jet drop stream associated therewith, as illustrated in FIG. 12. By curving the surfaces 74 as illustrated, the deflection effect may be heightened, since this surface will be relatively close to the opposing deflection electrode surface 78 in the region where the drops enter the space between surfaces 74 and 78, thus increasing the electric field in this area. The surface 74, however, curves rearwardly away from the jet drop stream such that drops in the catch trajectories 108 do not strike the surface 74, but rather are permitted to be deflected so as to strike plate 102.

By using an apertured plate 102 for catching with the printer being inverted, the difficulties encountered with prior art apertured catcher plates are eliminated. Mist and ink droplets will not collect on the surface of the plate adjacent the print receiving medium 22 and there is therefore no possibility that the print receiving medium will receive undesired drops of ink which, in prior art printers, tended to drip from the apertured catch plate onto the print receiving medium.

While the forms of apparatus herein described constitute preferred embodiments of the invention, it is to be understood that the invention is not limited to these precise forms of apparatus, and that changes may be made therein without departing from the scope of the invention.

What is claimed is:

1. An ink jet printer for selectively depositing drops from a plurality of jet drop streams along associated print lines on a moving print receiving medium to produce collectively a print image thereon, comprising:

print head means for generating a plurality of jet drop streams directed at said moving print receiving medium, said jet drop streams being arranged in a row which is inclined with respect to the direction of movement of said print receiving medium, means for selectively charging drops in each of said jet drop streams, means for providing a plurality of drop deflecting electrical fields, each of said plurality of jet drop streams passing through an associated one of said fields, said fields extending in a direction substantially perpendicular to the direction of movement of said print receiving medium, thereby deflecting the drops in each of said jet drop streams into a catch trajectory or into a selected one of a plurality of print trajectories, deflection of said drops being in a direction substantially perpendicular to the direction of movement of said print receiving medium, and means for catching drops in each jet drop stream which are deflected into a catch trajectory whereby the drops in said print trajectories are deposited along print lines on said print receiving medium and drops in said catch trajectories are prevented from striking said print receiving medium.

2. The ink jet printer of claim 1 in which said means for selectively charging drops in each of said jet drop streams comprises means for selectively charging drops in each jet drop stream to a selected one of a plurality of print charge levels or to a catch charge level, whereby drops charged to each print charge level are deflected in a direction parallel to said electrical fields to strike said print receiving medium on associated print lines, and whereby drops charged to said catch charge level are directed to said means for catching drops.

3. The ink jet printer of claim 1 in which said means for catching drops in each jet drop stream comprises catcher electrode means defining a plurality of catcher electrode surfaces, each of said catcher electrode surfaces positioned adjacent a respective one of said jet drop streams and extending substantially parallel to the direction of movement of said print receiving medium.

4. The ink jet printer of claim 3 in which said means for providing a plurality of drop deflecting electrical fields comprises deflection electrode means defining a plurality of electrically conductive deflection electrode surfaces, each of said deflection electrode surfaces positioned adjacent a respective one of said jet drop streams on the opposite side thereof from said catcher electrode surface associated therewith, and each deflection electrode surface extending substantially parallel to the direction of movement of said print receiving medium, and means for applying an electrical potential between each deflection electrode surface and its associated opposing catcher electrode surface, thereby producing a drop deflecting electrical field which extends substantially perpendicular to the direction of movement of said print receiving medium.

5. The ink jet printer of claim 4 in which said plurality of jet drop streams are directed downward toward said print receiving medium and in which said means for catching drops in said catch trajectories in each jet drop stream includes means defining a slot beneath each of said catcher electrode surfaces, means defining an ink manifold communicating with each of said slots, and means for providing an ink evacuating suction to said ink manifold, whereby drops in said catch trajectories strike said catcher electrode surfaces and are ingested into said manifold through said slots.

6. The ink jet printer of claim 4 in which said means for providing a plurality of drop deflecting electrical fields further comprises field isolation means extending between adjacent jet drop streams to isolate each of said jet drop streams from deflection electrode surfaces and catcher electrode surfaces associated with adjacent jet drop streams, whereby said drop deflecting electrical fields are maintained substantially perpendicular to the direction of movement of said print receiving medium.

7. The ink jet printer of claim 6 in which said plurality of jet drop streams are directed upward toward said print receiving medium and in which said means for catching drops in said catch trajectories in each jet drop stream includes an apertured catch plate positioned above said catcher electrode means and defining a plurality of openings, each of said openings being aligned with a respective one of said jet drop streams such that drops in said print trajectories pass through said openings and strike said print receiving medium while drops in said catch trajectories strike said catch plate.

8. The ink jet printer of claim 7 in which said catcher electrode means and said apertured catch plate define a slot therebetween and in which catcher electrode means defines an ink reservoir beneath said catch plate such that drops in said catch trajectories pass through said slot to strike said catch plate and thereafter drip into said ink reservoir.

9. The ink jet printer of claim 4 in which said print head means generates a plurality of parallel rows of jet drop streams, each of said rows being inclined with respect to the direction of movement of said print receiving medium and in which said means for catching drops in each jet drop stream includes a plurality of catcher electrode means, each of said catcher electrode means being positioned adjacent and to a first side of an associated one of said rows of jet drop streams.

10. The ink jet printer of claim 9 in which said means for providing a plurality of drop deflecting electrical fields comprises a plurality of deflection electrode means, each of said deflection electrode means being positioned adjacent and to a second side of an associated one of said rows of jet drop streams, whereby said plurality of catcher electrode means and said plurality of deflection electrode means are alternately arranged across the path of said print receiving medium.

11. The ink jet printer of claim 10 further comprising frame means for mounting said plurality of deflection electrode means and said plurality of catcher electrode means.

12. The ink jet printer of claim 11 in which each of said plurality of catcher electrode means defines a plurality of catcher electrode surfaces which are laterally offset along a row, which row is inclined with respect to the direction of movement of said print receiving medium.

13. The ink jet printer of claim 12 in which each of said plurality of deflection electrode means defines a plurality of deflection electrode surfaces which are laterally offset along a row, which row is inclined with respect to the direction of movement of said print receiving medium.

14. The ink jet printer of claim 13 in which said frame means comprises a pair of mounting bars extending in a direction substantially perpendicular to the direction of movement of said print receiving medium, and a pair of end blocks, one of said pair attached to said mounting bars at the first ends thereof and the other of said pair attached to said mounting bars at the second ends thereof, thereby forming a frame for support of said plurality of deflection electrode means and said plurality of catcher electrode means.

* * * * *